(12) United States Patent
Walsh et al.

(10) Patent No.: US 8,432,170 B1
(45) Date of Patent: Apr. 30, 2013

(54) INTEGRATED CAPACITANCE MODEL CIRCUIT

(75) Inventors: Paul M. Walsh, Cork (IE); Keith O'Donoghue, Cork (IE)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 13/536,238

(22) Filed: Jun. 28, 2012

Related U.S. Application Data

(60) Provisional application No. 61/610,917, filed on Mar. 14, 2012.

(51) Int. Cl.
*G01R 27/26* (2006.01)
(52) U.S. Cl.
USPC ........ 324/658; 324/661; 324/750.3; 345/174; 345/173
(58) Field of Classification Search .................. None
See application file for complete search history.

(56) References Cited

U.S. PATENT DOCUMENTS

| | | | | |
|---|---|---|---|---|
| 6,108,055 | A * | 8/2000 | Oima et al. ...................... 349/38 |
| 6,512,381 | B2 * | 1/2003 | Kramer .......................... 324/658 |
| 6,581,174 | B2 | 6/2003 | Stubbs |
| 6,731,121 | B1 * | 5/2004 | Hsu et al. ....................... 324/678 |
| 6,869,895 | B1 | 3/2005 | Clevenger et al. |
| 7,127,648 | B2 | 10/2006 | Jiang et al. |
| 7,770,078 | B2 | 8/2010 | Thurston et al. |
| 7,831,070 | B1 * | 11/2010 | Cheng et al. .................. 382/124 |
| 8,049,302 | B2 | 11/2011 | Darabi et al. |
| 8,115,497 | B2 * | 2/2012 | Gozzini ......................... 324/661 |
| 8,165,555 | B1 * | 4/2012 | De Bernardinis et al. .... 455/307 |
| 8,207,944 | B2 * | 6/2012 | Geaghan ........................ 345/173 |
| 2005/0262458 | A1 * | 11/2005 | Gordin et al. ...................... 716/4 |
| 2006/0286691 | A1 | 12/2006 | Goren et al. |
| 2007/0268275 | A1 * | 11/2007 | Westerman et al. .......... 345/173 |
| 2008/0007539 | A1 * | 1/2008 | Hotelling ........................ 345/173 |
| 2008/0278453 | A1 | 11/2008 | Reynolds et al. |
| 2009/0153152 | A1 * | 6/2009 | Maharyta et al. ............. 324/684 |
| 2010/0156839 | A1 | 6/2010 | Ellis |
| 2010/0237468 | A1 | 9/2010 | Daley et al. |
| 2010/0238135 | A1 * | 9/2010 | Brown et al. ................. 345/175 |
| 2010/0244859 | A1 | 9/2010 | Cormier, Jr. et al. |
| 2011/0018829 | A1 | 1/2011 | Peng |
| 2011/0101994 | A1 | 5/2011 | Hsu et al. |
| 2011/0109585 | A1 * | 5/2011 | Kwon et al. ................... 345/174 |
| 2011/0234523 | A1 * | 9/2011 | Chang et al. .................. 345/173 |
| 2012/0043973 | A1 * | 2/2012 | Kremin ......................... 324/658 |
| 2012/0050214 | A1 * | 3/2012 | Kremin et al. ................. 345/174 |
| 2012/0200524 | A1 | 8/2012 | Vallis et al. |

OTHER PUBLICATIONS

Laknaur, A. et al. (Mar. 1, 2005) "Built-In-Self-Testing Techniques for Programmable Capacitor Arrays," Southern Illinois University Carbondale Paper 42. 7 pages.

Auramicro Corp. (2009) "AUR3852" located at http://www.auramicro.com/eng/product_details.php?CatalogID=4&SubCatalogID=5&ProductID=52, downloaded on Jun. 22, 2012, 2 pages.

(Continued)

*Primary Examiner* — Richard Isla Rodas

(57) ABSTRACT

Apparatuses and methods of an integrated capacitance model circuit are described. A capacitance model circuit is disposed on a common carrier substrate of an integrated circuit (IC) having a capacitance-sensing device. The capacitance model circuit is configured to model a capacitance of an external sense array. The capacitance model circuit is programmable.

13 Claims, 11 Drawing Sheets

OTHER PUBLICATIONS

Hwang, T-H. (May 2010). "A Highly Area-Efficient Controller for Capacitive Touch Screen Panel Systems," IEEE 56 (2):1115-1122. (Abstract only).

U.S. Appl. No. 61/610,917: "CR Correlation Concept," Paul Walsh, filed on Mar. 14, 2012; 10 pages.

International Search Report for International Application No. PCT/US12/53231 dated Nov. 16, 2012; 2 pages.

Written Opinion of the International Searching Authority for International Application No. PCT/US12153231 mailed Nov. 16, 2012; 5 pages.

\* cited by examiner

INTEGRATED CAPACITANCE MODEL CIRCUIT

RELATED APPLICATIONS

This application claims the benefit of U.S. Provisional Application No. 61/610,917, filed Mar. 14, 2012, the entire contents of which are incorporated by reference.

TECHNICAL FIELD

The present disclosure relates generally to capacitance-sensing systems, and more particularly to testing capacitance-sensing systems.

BACKGROUND

Capacitance sensing systems can sense electrical signals generated on electrodes that reflect changes in capacitance. Such changes in capacitance can indicate a touch event (i.e., the proximity of an object to particular electrodes). Capacitive sense elements may be used to replace mechanical buttons, knobs, and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface.

Transparent touch screens that utilize capacitive sense arrays are ubiquitous in today's industrial and consumer markets. They can be found on cellular phones, GPS devices, set-top boxes, cameras, computer screens, MP3 players, digital tablets, and the like. The capacitive sense arrays work by measuring the capacitance of a capacitive sense element, and looking for a delta in capacitance indicating a touch or presence of a conductive object. When a conductive object (e.g., a finger, hand, or other object) comes into contact or close proximity with a capacitive sense element, the capacitance changes, and the conductive object is detected. The capacitance changes of the capacitive touch sense elements can be measured by an electrical circuit. The electrical circuit converts the measured capacitances of the capacitive sense elements into digital values.

There are two typical types of capacitance; 1) mutual capacitance where the capacitance-sensing circuit has access to both electrodes of the capacitor; 2) self capacitance where the capacitance-sensing circuit has only access to one electrode of the capacitor where the second electrode is tied to a DC voltage level. A touch panel has a distributed load of capacitance of both types (1) and (2) and Cypress' touch solutions sense both capacitances either uniquely or in hybrid form with its various sensing modes.

When characterizing, calibrating or debugging the silicon a touch screen or external components need to be connected to the chip to facilitate any measurement. These exhibit uncontrolled variations and it's difficult to ensure all channels see the same capacitances so comparisons between channels are difficult. In addition to vary the capacitances (for channel variance or linearity testing for example), new external capacitors need to be added and the variations are uncorrelated so good measurement accuracy is hard to achieve.

BRIEF DESCRIPTION OF THE DRAWINGS

The present invention is illustrated by way of example, and not of limitation, in the figures of the accompanying drawings in which.

DETAILED DESCRIPTION

Apparatuses and methods of an integrated capacitance model circuit are described. A capacitance model circuit is disposed on a common carrier substrate of an integrated circuit (IC) having a capacitance-sensing device. The capacitance model circuit is configured to model a capacitance of an external sense array. The capacitance model circuit is programmable. In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 1:
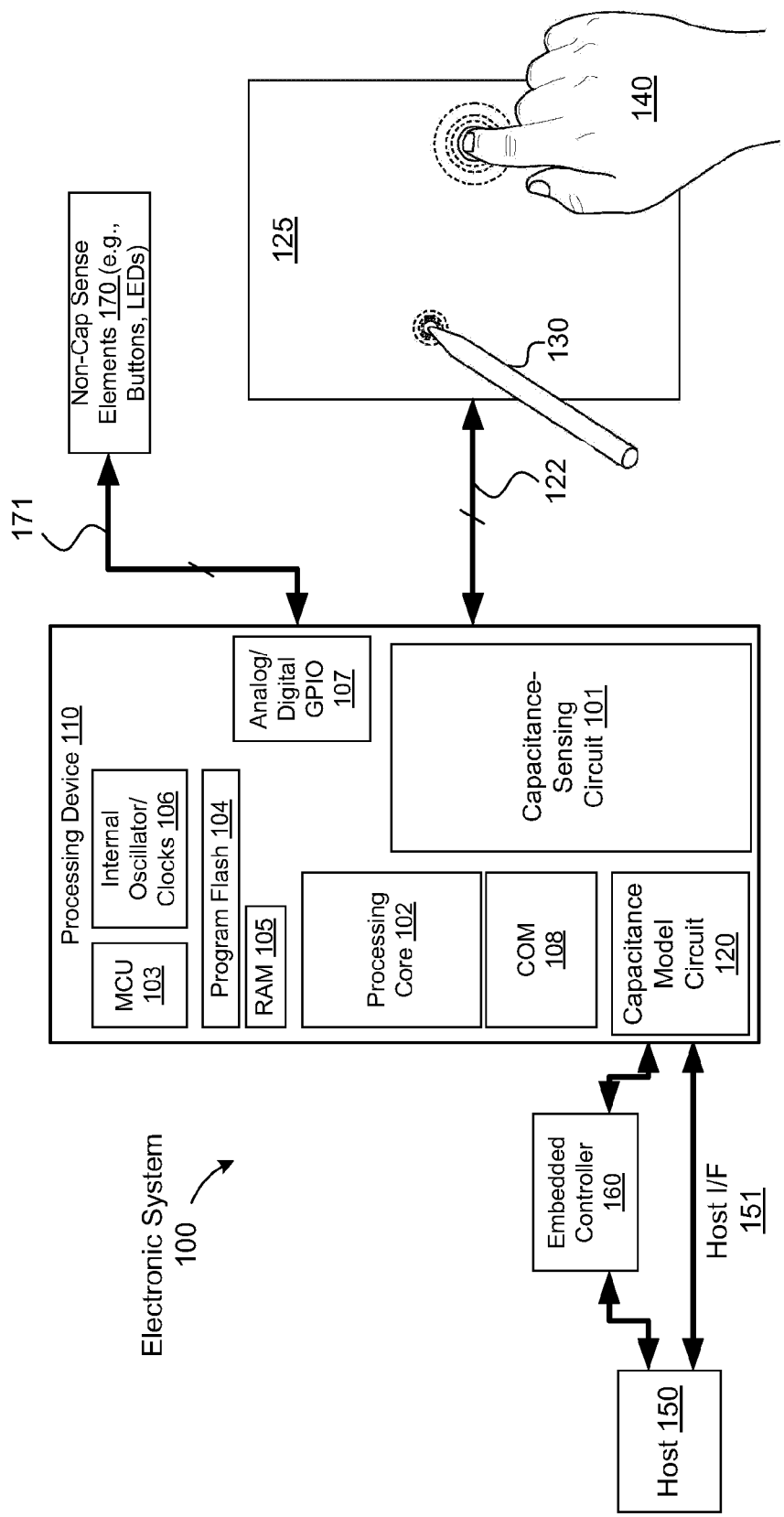
FIG. 1 is a block diagram illustrating one embodiment of an electronic system having a processing device for detecting a presence of a touch object and a stylus, the processing device including a capacitance model circuit.

FIG. 1 is a block diagram illustrating one embodiment of an electronic system 100 having a processing device 110 for detecting a presence of a touch object 140 and a stylus 130, the processing device including a capacitance model circuit 120. Electronic system 100 includes processing device 110, capacitive sense array 125, stylus 130, host processor 150, embedded controller 160, and non-capacitive sense elements 170. In the depicted embodiment, the electronic system 100 includes the capacitive sense array 125 coupled to the processing device 110 via bus 122. The capacitive sense array 125 may be part of a touch-sensing device. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

In the depicted embodiment, the processing device 110 includes an integrated capacitance model circuit 120. The capacitance model circuit is configured to model a capacitance of an external sense array, such as for testing, calibrating, or the like. The capacitance model circuit 120 is programmable. Additional details regarding the capacitance model circuit 120 is described in more detail below with respect to FIGS. 3-11.

The operations and configurations of the processing device 110 and the capacitive sense array 125 for detecting and tracking the touch object 140 and stylus 130 are described herein. In short, the processing device 110 is configured to detect a presence of the touch object 140, a presence of the active stylus 130 on the capacitive sense array 125, or any combination thereof. The processing device 110 may detect and track the active stylus 130 and the touch object 140 individually on the capacitive sense array 125. In one embodiment, the processing device 110 can detect and track both the active stylus 130 and touch object 140 concurrently on the capacitive sense array 125. In one embodiment, the active stylus 130 is configured to operate as the timing "master," and the processing device 110 adjusts the timing of the capacitive sense array 125 to match that of the active stylus 130 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130.

In the depicted embodiment, the processing device 110 includes analog and/or digital general-purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MCU") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable UMs. The analog block array may also be coupled to the GPIO 107.

As illustrated, capacitance-sensing circuit 101 may be integrated into processing device 110. Capacitance-sensing circuit 101 may include analog I/O for coupling to an external component, such as touch-sensor pad (not shown), capacitive sense array 125, touch-sensor slider (not shown), touch-sensor buttons (not shown), and/or other devices. The capacitance-sensing circuit 101 may be configured to measure capacitance using mutual capacitance sensing techniques, self capacitance sensing technique, charge coupling techniques or the like. In one embodiment, capacitance-sensing circuit 101 operates using a charge accumulation circuit, a capacitance modulation circuit, or other capacitance sensing methods known by those skilled in the art. In an embodiment, the capacitance-sensing circuit 101 is of the Cypress TMA-3xx family or TMA-4xx family of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the TX and RX electrodes are configured in rows and columns, respectively. It should be noted that the rows and columns of electrodes can be configured as TX or RX electrodes by the capacitance-sensing circuit 101 in any chosen combination. In one embodiment, the TX and RX electrodes of the sense array 200 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. An intersection between two sense elements may be understood as a location at which one sense electrode crosses over or overlaps another, while maintaining galvanic isolation from each other. The capacitance-sensing circuit 101 does not use mutual capacitance or self-capacitance sensing to measure capacitances of the sense elements when using a stylus. Rather, the capacitance-sensing circuit 101 measures a charge that is capacitively coupled between the sense array 200 and the stylus as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes. In another embodiment, the presence of the finger increases the coupling capacitance between the two electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of centroid algorithms may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 121, 122, and 171 are embodied in a single bus. Alternatively, these buses may be configured into any combination of one or more separate buses.

Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance-sensing circuit 101 may be integrated into the IC of the processing device 110, or alternatively, in a separate IC. Alternatively, descriptions of capacitance-sensing circuit 101 may be generated and compiled for incorporation into other integrated circuits. For example, behavioral level code describing the capacitance-sensing circuit 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, and eBook reader, global position system ("GPS") or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc) handwriting recognition, and numeric keypad operation.

Touch sensing involves sensing capacitances and more importantly a change in capacitance caused by the presence of a finger or object. There are two typical types of capacitance; 1) mutual capacitance where the sensor has access to both electrodes of the capacitor; 2) self capacitance where the sensor has only access to one electrode of the capacitor where the second electrode is tied to a DC voltage level. A touch panel has a distributed load of capacitance of both types 1) and 2) and the capacitance-sensing circuits 101 can sense both capacitances either uniquely or in hybrid form with its various sensing modes.

When characterizing, calibrating or debugging the integrated circuit of a processing device (without the capacitance model circuit 120), a touch screen or external components are need to be connected to the integrated circuit (also referred to herein as chip) to facilitate any measurement. These exhibit uncontrolled variations and it can be difficult to ensure all sensing channels of a capacitance-sensing circuit observe the same capacitance. So, comparisons between channels may be complicated by variations in the touch screen or external components. In addition, to vary the capacitances, during channel variance or linearity testing for example, new external capacitors need to be added whose variations are uncorrelated. This makes it hard to achieve good measurement accuracy.

Figure 2:
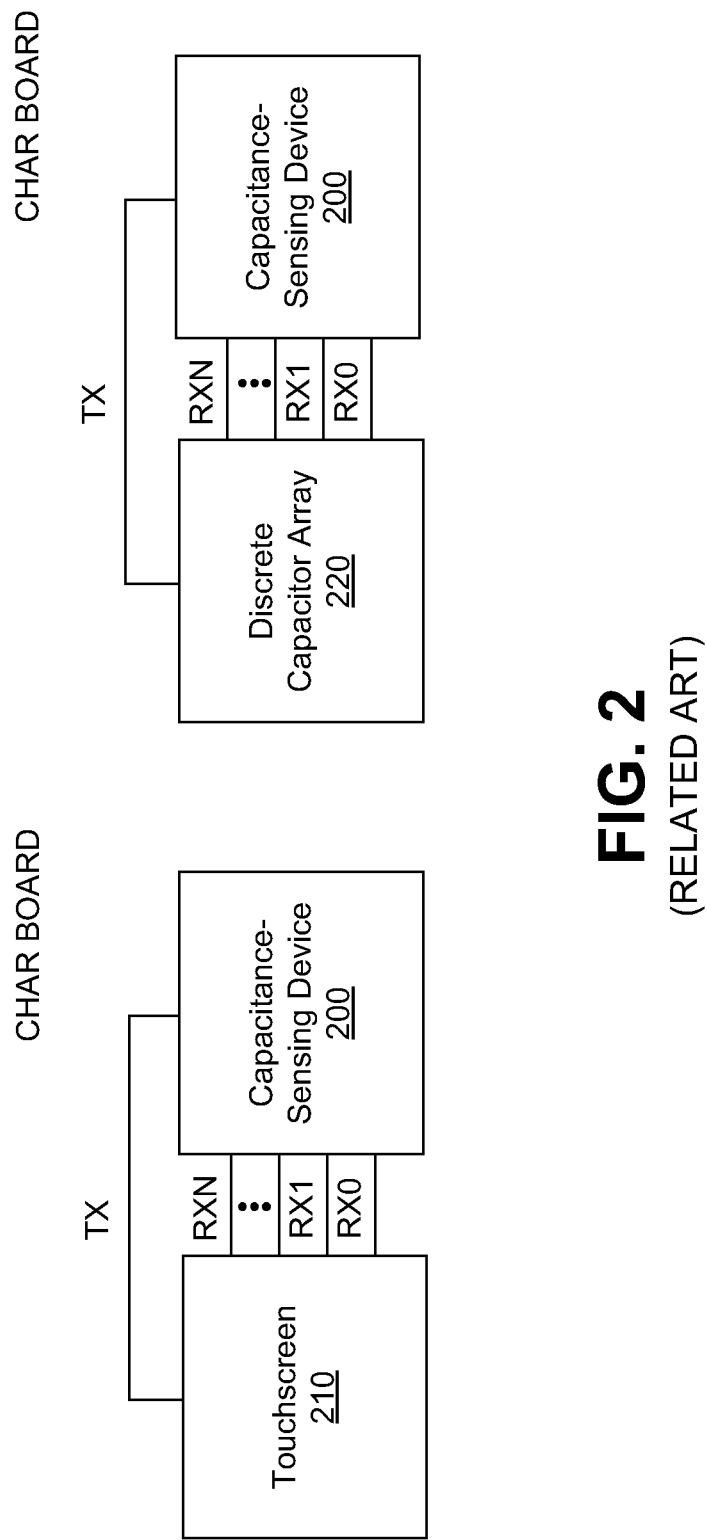
FIG. 2 is a block diagram illustrating a capacitance-sensing device being tested with an external touchscreen and with an external discrete capacitor array.

Conventional systems used external capacitances or external touch screen's to characterize the touch silicon, such as illustrated in FIG. 2. FIG. 2 illustrates a capacitance-sensing device 200 being testing with an external touchscreen 210 and with an external discrete capacitor array 220. One conventional testing solution uses the external touchscreen 210 to test the capacitance-sensing device 200, and in particular, the capacitance-sensing circuit of the capacitance-sensing device 200. Another conventional testing solution uses an array of external discrete capacitors in the discrete capacitor array 200, rather than an external indium tin oxide (ITO) touch screen. Discrete array of external capacitors, rather than ITO or some other touch screen material, may provide additional control than that provided by touch screen. Even using discrete capacitors, each channel may see different capacitances, resulting in channel variation measurements including variations in the capacitors of the array 220. It should also be noted the array of discrete capacitors 220 are not individually programmable without soldering in a new capacitor.

These conventional testing solutions have some drawbacks including: 1) Reliance on external components which have poor tolerances; 2) Char boards are required to host these components and facilitate testing; 3) High cost as production/char tests require additional components on the board and no two boards have identical capacitors; 4) Performance assessments may be crude as all sensing channels do not see the same capacitances; Thus, the comparisons between sensing channels were approximate; and 5) It was not possible to calibrate the channel gain to be within <1% with external components.

The embodiments described herein provide a simple integrated capacitance model circuit, also referred to as a simple on-chip model. The integrated capacitance model circuit may be configured to model a capacitance of an external sense array, such as for testing, calibrating, or the like. For example, the integrated capacitance model circuit may be configured to model an intersection of electrodes of an external sense array, such as a touch screen intersection. The integrated capacitance model circuit is programmable. The integrated capacitance model circuit may be programmed to connect to any sensing channels of the capacitance-sensing circuit 101. For example, the integrated capacitance model circuit may be connected to any receive channel and a transmitter. A touch screen has capacitance variations across its intersections and it is difficult to guarantee the capacitance value, making it difficult to characterize all channels equally. With the integrated capacitance model circuit, the capacitances are known or can be calibrated and all sensing channels can see a known capacitance as the integrated capacitance model circuit connects to all channels. It should also be noted that the programmable capacitors of the capacitance model circuit 120 (chip capacitors) match to within a fraction of a percent since they are integrated, allowing good accuracy to be achieved for characterization. The integrated capacitance model circuit can also have programmable resistances added to model panel time constants and enable full built-in-self-test (BIST) functional testing of the capacitance-sensing device in production, and in particular, the transmit (TX) and receive (RX) channels of the capacitance-sensing circuit 101. It should also be noted that while the integrated capacitance model circuit can be used for both simulation of the channels and for physical characterization and Failure Analysis, the integrated capacitance model circuit may allow physical testing and analysis of the integrated circuit itself.

Figure 3:
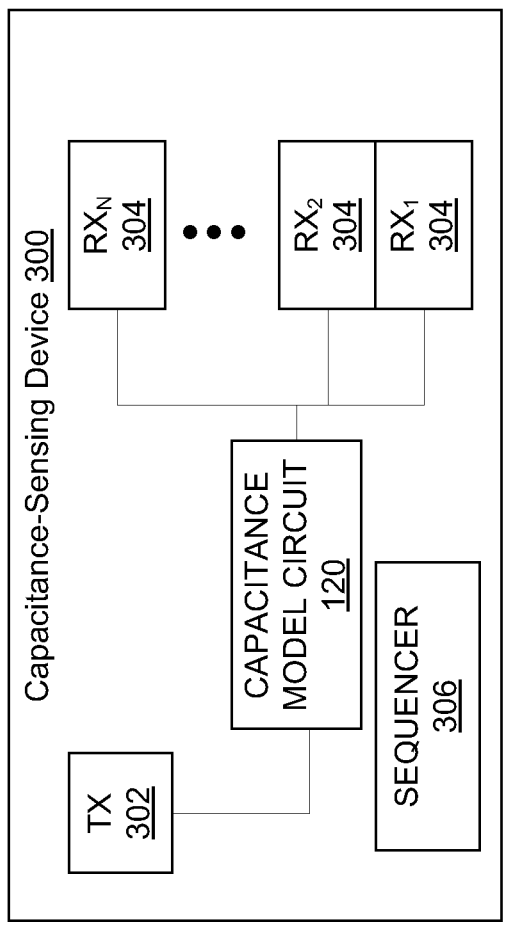
FIG. 3 is a block diagram illustrating one embodiment of a capacitance-sensing device including a capacitance model circuit.

FIG. 3 is a block diagram illustrating one embodiment of a capacitance-sensing device 300 including a capacitance model circuit 120. The capacitance-sensing device 300 includes a transmitter coupled to a transmit (TX) channel 302 and multiple sensing channels (RX channels) 304 coupled to sensing circuitry. The TX channel 302 and RX channels 304 are controlled by the sequencer 306. The sequencer 306 is configured to connect and disconnect the TX channel 302 and the RX channels to the capacitance model circuit 120. The sequencer 306 is also configured to control the timing of the TX signals on the TX channel 302 and the timing of the sensing by the RX channels 304. FIG. 3 shows how measurements are performed with the integrated capacitance model circuit 120. No external components are needed and the test is easily performed during production to exercise the full sense functionality of the integrated circuit.

The capacitance model circuit 120 allows on-chip testing, including BIST at production of the capacitance-sensing device 300 and is useful for failure analysis (FA) of the capacitance-sensing device 300. The capacitance model circuit 120 includes programmable capacitors and has the ability to model various types of capacitances, including, but not limited to, mutual capacitance, self capacitance, or any combination thereof. The capacitance model circuit 120 provides tight matching between on-chip capacitors.

Figure 4:
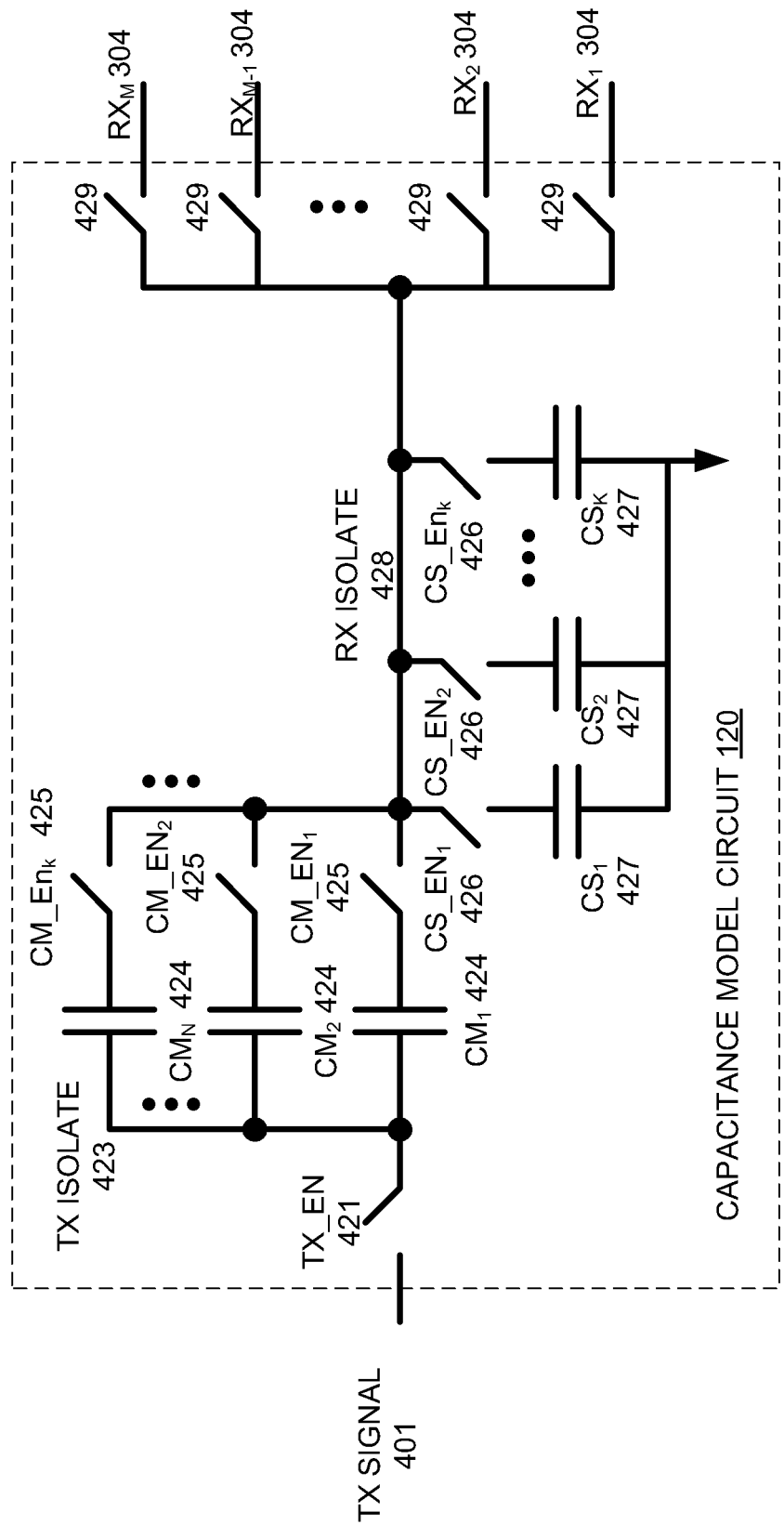
FIG. 4 is a circuit diagram illustrating one embodiment of the capacitance model circuit.

FIG. 4 is a circuit diagram illustrating one embodiment of the capacitance model circuit 120. The capacitance model circuit 120 includes programmable capacitors CM 424 and CS 427. The programmable capacitors CM 424 may be capacitors to model mutual capacitance and the programmable capacitors CS 427 may be capacitors to model self capacitance. It should be noted that three programmable capacitors CM 424 are illustrated, but the capacitance model circuit 120 may include one or more programmable capacitors to model mutual capacitance. Similarly, three programmable capacitors CS 427 are illustrated, but the capacitance model circuit 120 may include one or more programmable capacitors to model self capacitance. Of course, the capacitance model circuit 120 may include any combination of one or more programmable capacitors to model capacitance, including mutual capacitance, self capacitance, or the like.

Each of the programmable capacitors CM 424 are coupled to switches 425 (CM_EN), and each of the programmable capacitors CS 427 are coupled to switches 426 (CS_EN). The programmable capacitors CM 424 are coupled in parallel to one another. In particular, one terminal of each of the programmable capacitors CM 424 are coupled to a TX isolate node 423, and the other terminal of the programmable capacitors CM 424 are coupled to a RX isolate node 428. The programmable capacitors CS 427 are coupled in parallel to one another. In particular, one terminal of each of the programmable capacitors CS 427 are coupled to the RX isolate node 428, and the other terminal of the programmable capacitors CS 427 are coupled to a common potential, such as a ground potential.

The capacitance model circuit 120 may be coupled to receive a TX signal 401 from a transmitter (not illustrated in FIG. 4). In one embodiment, the capacitance model circuit 120 includes a switch 421 (TX_EN) to allow the capacitance model circuit 120 to connect and disconnect from the transmitter. The RX isolate 428, which is coupled to the switches 425 and 426, can be coupled to one or more RX sensing channels 304. Each of the RX sensing channels 304 includes a switch 429 to connect and disconnect the respective RX channel 304 to the RX isolate node 428. In one embodiment, the RX isolate 428 is coupled to one RX channel at a time. In another embodiment, the RX isolate 428 is coupled to two or more RX channels at a time. It should also be noted that four RX channels 304 are illustrated, but any number of RX channels 304 may be used.

In one embodiment, the programmable capacitors 424 and 427 are vertical parallel plate (VPP) capacitors. In another embodiment, the programmable capacitors 424 and 427 are metal oxide semiconductor (MOS) capacitors. In another embodiment, the programmable capacitors 424 and 427 are metal-insulator-metal (MIM) capacitors.

In one embodiment, the operation of the capacitance model circuit 120 for mutual capacitance sensing is as follows: 1) A certain number of mutual capacitors 424 is programmed in by closing any number of $CM\_EN_N$ switches 425. In one embodiment, a $CS_N$ switch can also be optioned in but will not form part of the mutual measurement. 2) A single RX channel 304 is enabled by closing the respective switch 429; 3) TX_EN switch 421 is closed; 4) the TX signal 401 is applied to the TX isolate node 423 of the CM capacitors 424; 5) a mutual capacitance measurement is taken with the enabled RX channel 304; and 6) another measurement may be taken with a different $CM_N$ 424 or with a different RX channel 304 for testing a different mutual capacitance or a different RX channel 304.

In one embodiment, the operation of the capacitance model circuit 120 for self sensing is as follows: 1) A certain number of self capacitors 427 are programmed in by closing any number of $CS\_EN_K$ switches 426; 2) TX_EN switch 421 is open Likewise all the $CM\_EN_N$ switches 425 are open; 3) A single RX channel 304 is enabled by closing the respective switch 429; 4) A self capacitance measurement is taken with the enabled RX channel 304; and 5) another measurement may be taken with a different $CS_K$ switch 426 or with a different RX channel 304 for testing a different self capacitance or a different RX channel 304.

The channel can also be operated in hybrid mode with both CM capacitors 424 and CS capacitors 427 connected. This may be used to test Hybrid sensing modes or to test the self capacitance sensing with a shield driver being applied to the opposite side of the CM capacitors 424, such as a TX operating in self capacitance mode with the same voltage and phase as the RX.

In one embodiment, a sequencer is configured to operate the TX and RX circuitry for touch sensing and may be used during the operation of the capacitance model circuit 120. In one embodiment, registers may be used to generate enable signals for the switches 421, 425, 426, and 429 to enable and disable the CM capacitors 424, the CS capacitors 427 and the TX signal 401 and the RX sensing channels 304 in different configurations. In another embodiment, the enable signals may be generated from a processing device, such as a processing core 102, or other circuitry of the processing device 110. In another embodiment, the sequencer can be configured with a test mode in which it controls the timing of the TX and RX circuitry, as well as the enable signals to program the capacitance model circuit 120.

Figure 5:
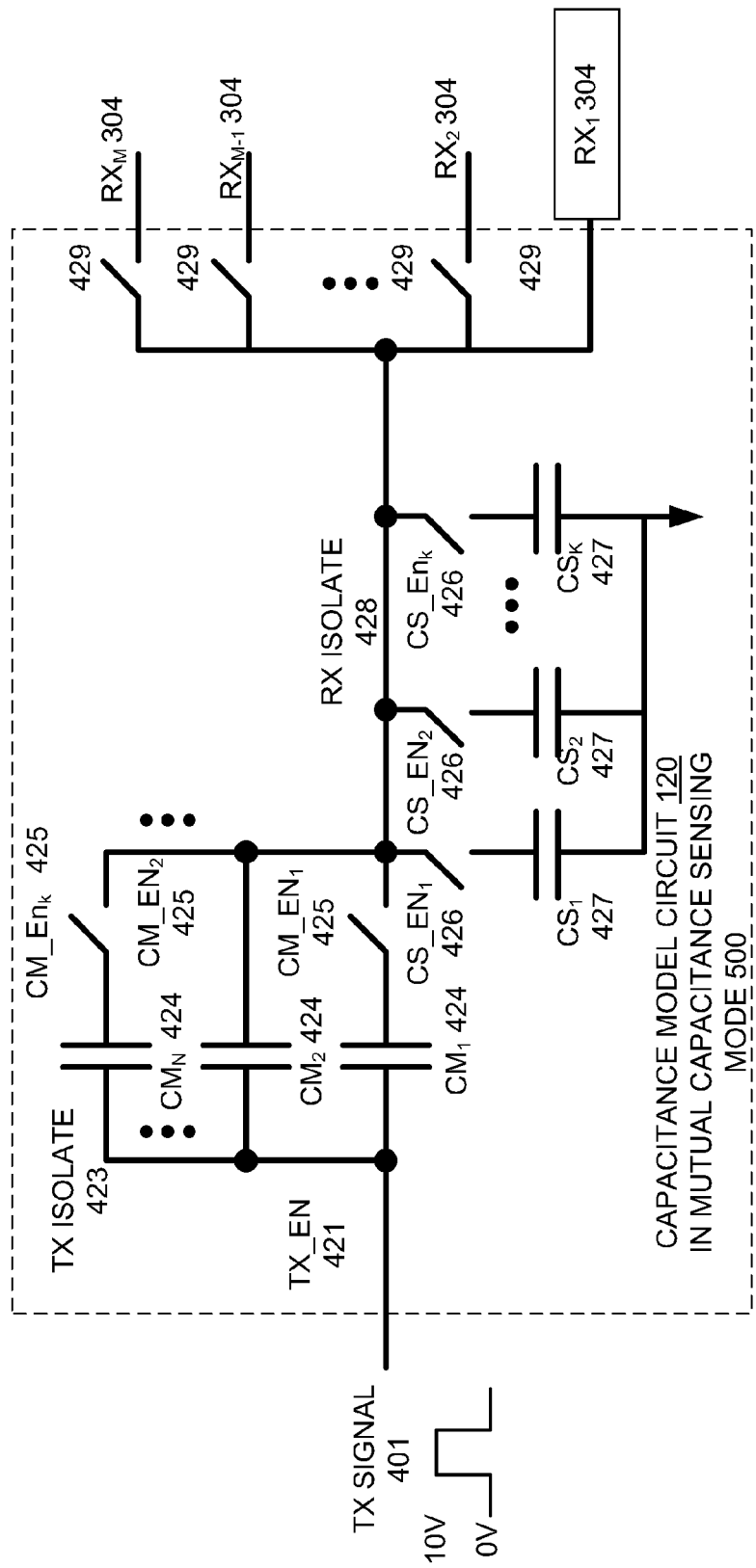
FIG. 5 is a circuit diagram illustrating one embodiment of the capacitance model circuit in a mutual capacitance sensing mode.

FIG. 5 is a circuit diagram illustrating one embodiment of the capacitance model circuit 120 in a mutual capacitance sensing mode 500. The configuration of the capacitance model circuit 120 includes enabling one or more CM_EN switches 425. In the depicted embodiment, the second $CM\_EN_2$ switch 425 is enabled to be a mutual capacitor 424 between TX and RX. The first switch 429 is enabled for the first RX sensing channel 304. A TX square wave (e.g., 0 to 10 V) is applied as the TX signal 401 to one side of the enabled mutual capacitor 424 via the TX isolate node 423. The RX channel 304 holds the RX isolate node 428 at a constant voltage. The charge generated across the mutual capacitor 424 by toggling the TX signal 401 is converted to a digital output by RX channel 304. The RX channel 304 performs charge to digital conversion.

Figure 6:
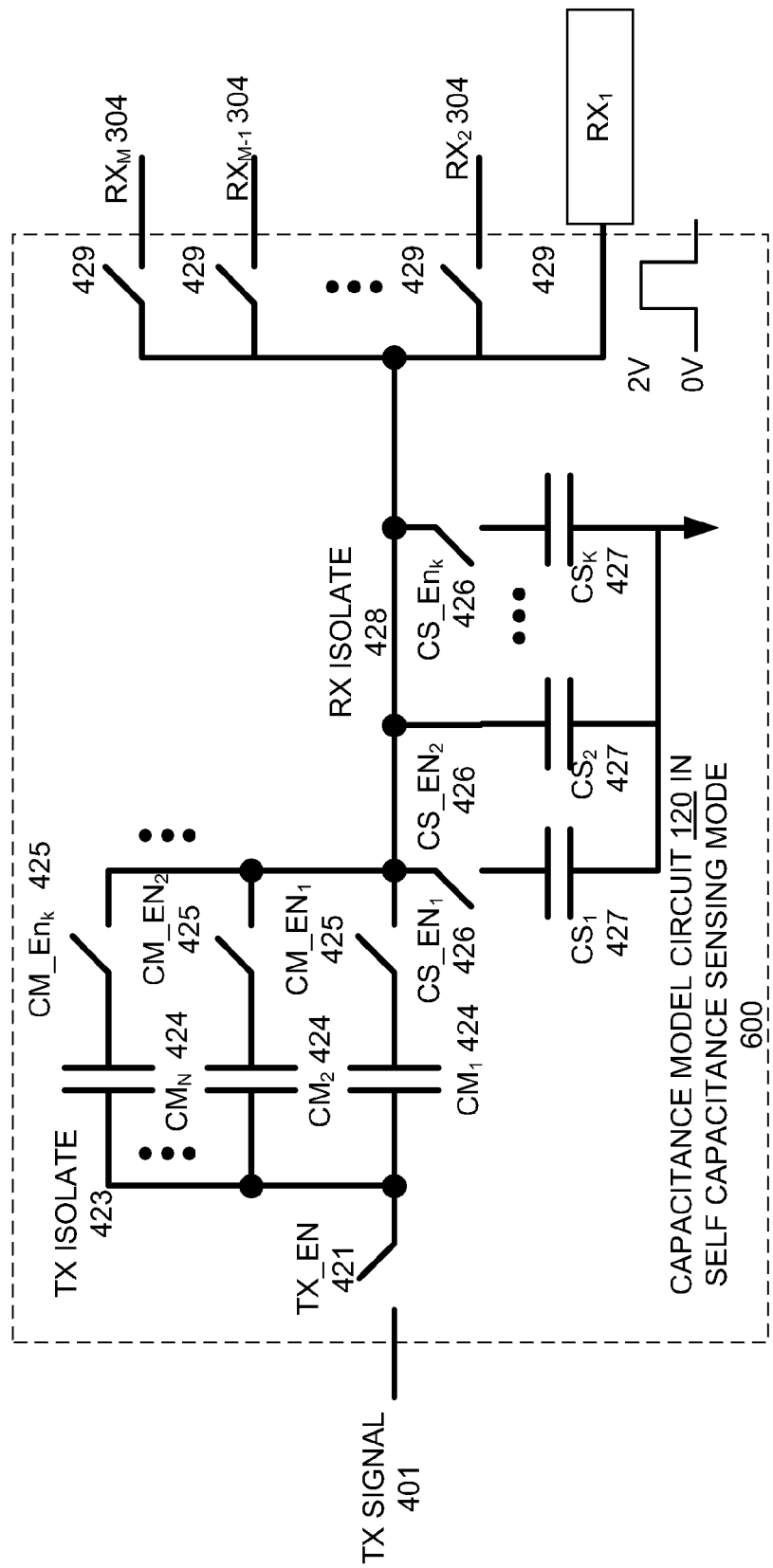
FIG. 6 is a circuit diagram illustrating one embodiment of the capacitance model circuit in a self-capacitance sensing mode.

FIG. 6 is a circuit diagram illustrating one embodiment of the capacitance model circuit 120 in a self-capacitance sensing mode 600. The configuration of the capacitance model circuit 120 includes enabling one or more CS_EN switches 426. In the depicted embodiment, the second $CS\_EN_2$ switch 426 is enabled to be a self capacitor 427 between RX isolate node 428 and the common potential. The first switch 429 is enabled for the first RX sensing channel 304. The RX channel 304 modulates the RX isolate node 428 by applying an RX square wave (e.g., 0 to 2 V) to the RX signal to on one side of the self capacitor 427. It should be noted that in this embodiment, the TX_EN switch 421 is open so that the TX signal 401 is not applied to the mutual capacitors 424. Also, the CM_EN switches 425 may also be open. The charge generated across the self capacitor 427 by toggling the RX signal is converted to a digital output by RX channel 304. The RX channel 304 performs charge to digital conversion. It should be noted that CM capacitors are present in an actual touch panel, and the capacitance model circuit 120 can mimic the behavior of the CM capacitors of the actual touch panel by applying a shield Tx driver of the same magnitude as the RX signal to the TX input.

Figure 7:
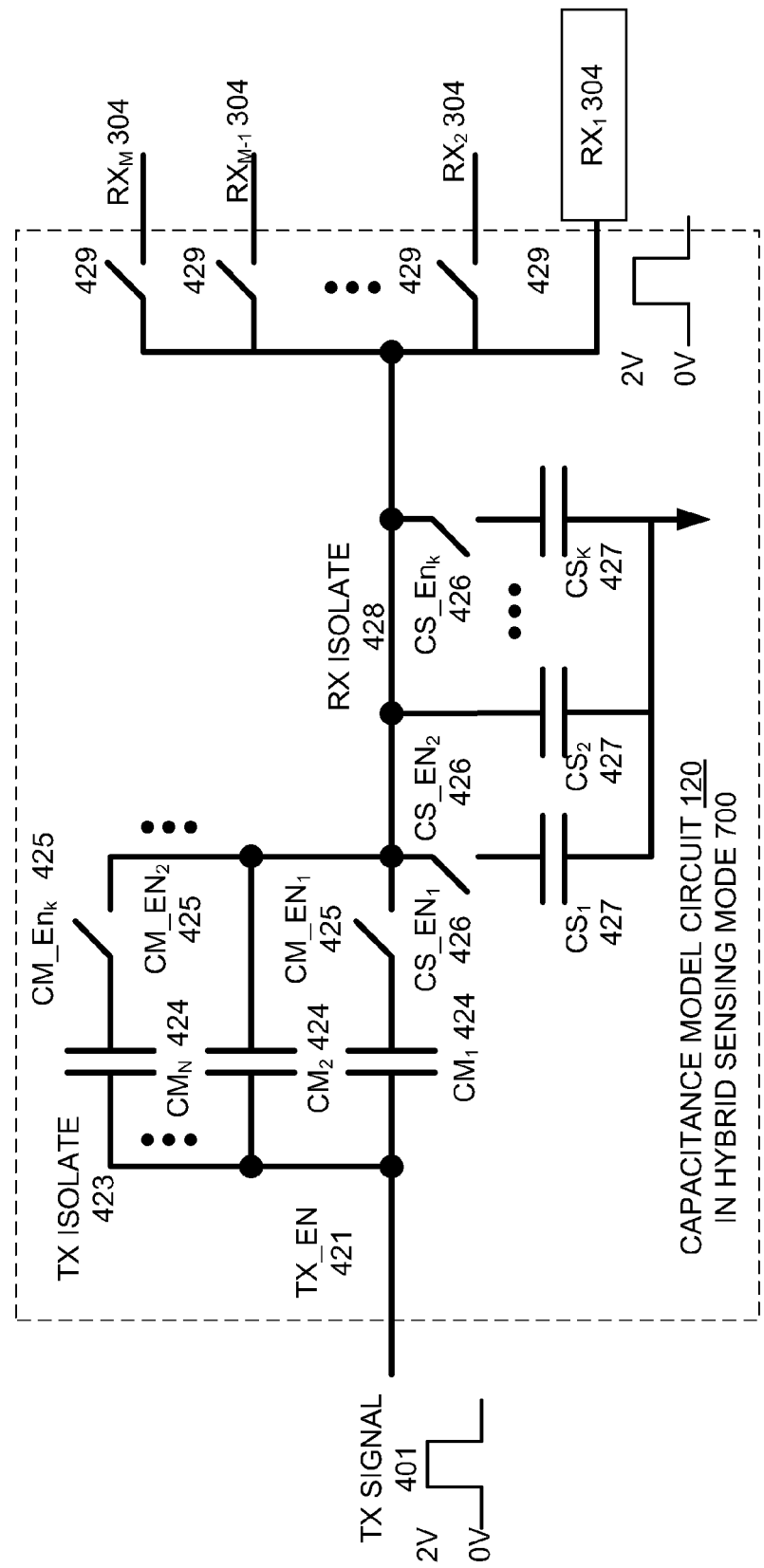
FIG. 7 is a circuit diagram illustrating one embodiment of the capacitance model circuit in a hybrid sensing mode.

FIG. 7 is a circuit diagram illustrating one embodiment of the capacitance model circuit 120 in a hybrid sensing mode 700. The configuration of the capacitance model circuit 120 for the hybrid sensing mode 700 is similar to that of self capacitance sensing mode 600, except the TX_EN switch 421 is closed and the second CM_EN2 switch 425 is closed so that the TX signal 401 is applied to the mutual capacitor 424. The TX signal 401 modulates in the same direction and magnitude as the RX signal on RX isolate node 428. The charge generated across the self capacitor 427 by toggling RX signal is converted to a digital output by RX channel 304. The RX channel 304 performs charge to digital conversion.

In another embodiment, the capacitance model circuit 120 may include a single programmable mutual capacitor or a single programmable self capacitor. Alternatively, the capacitance model circuit 120 may have different combination of programmable mutual capacitors and programmable self capacitors.

The capacitance model circuit 120 may be used for functional testing of the capacitance-sensing device. The capacitance model circuit 120 may also be used for linearity measurements, accuracy measurements, matching measurements, or the like. The capacitance model circuit 120 may be used for on-chip testing of capacitive sensing circuitry. The capacitive sensing circuitry may use one or more different capacitance sensing techniques, and the capacitance model circuit 120 is configured to model capacitance of an external sense array to test the capacitive-sensing circuitry. In another embodiment, the capacitance model circuit 120 may be used as an on-chip temperature sensor. For example, the on-chip capacitor could experience a linear change with temperature. The capacitance sensing method may use the capacitance model circuit 120 to sense this linear change with temperature and convert the sensed capacitance and convert it to temperature. The embodiments described herein may be used by a manufacture to perform production tests, calibrate, debug, characterize, or any combination thereof on the integrated circuits having the capacitance-sensing circuits in one or more different capacitance sensing modes. This may be done in a cheap, efficient, accurate, and reliable manner as compared to the conventional solutions described above.

Figure 8:
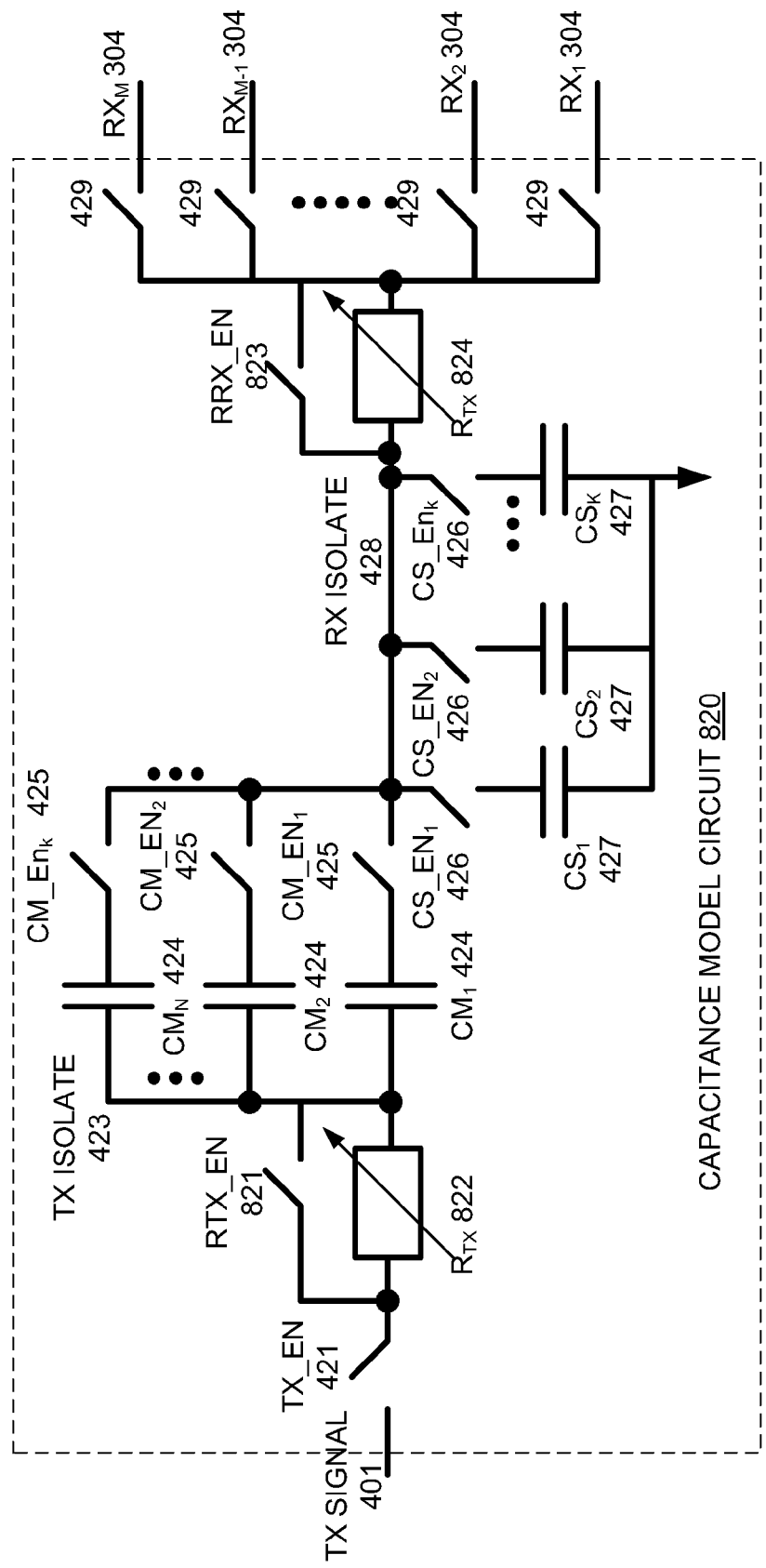
FIG. 8 is a circuit diagram illustrating one embodiment of the capacitance model circuit with programmable resistors.

FIG. 8 is a circuit diagram illustrating one embodiment of the capacitance model circuit 820 with programmable resistors 822, 824. The capacitance model circuit 820 is similar to the capacitance model circuit 120 as noted in similar reference numbers. However, the capacitance model circuit 820 includes programmable resistors 822 and 824. The programmable resistor 822 can be enabled by opening RTX_EN switch 821, and the programmable resistor 824 can be enabled by opening RRX_EN switch 823. In one embodiment, the programmable resistors 822 and 824 can be used to evaluate impact of different RC time responses for different external sense arrays. The programmable resistors 822 and 824 can also be used to test the programmable drive strength of the TX signal 401. In other embodiments, fixed resistors could be switched in and out to obtain different resistance values, instead of using programmable resistors as would be appreciated by one of ordinary skill in the art having the benefit of this disclosure.

In another embodiment, the capacitance model circuit 120 or 820 can include circuitry to connect to multiple TX lines and multiple RX lines, such as described below with respect to FIG. 9. For example, the capacitance model circuit 120 or 820 can be configured to apply multiple TX pulses to test multiple phase sensing.

Figure 9:
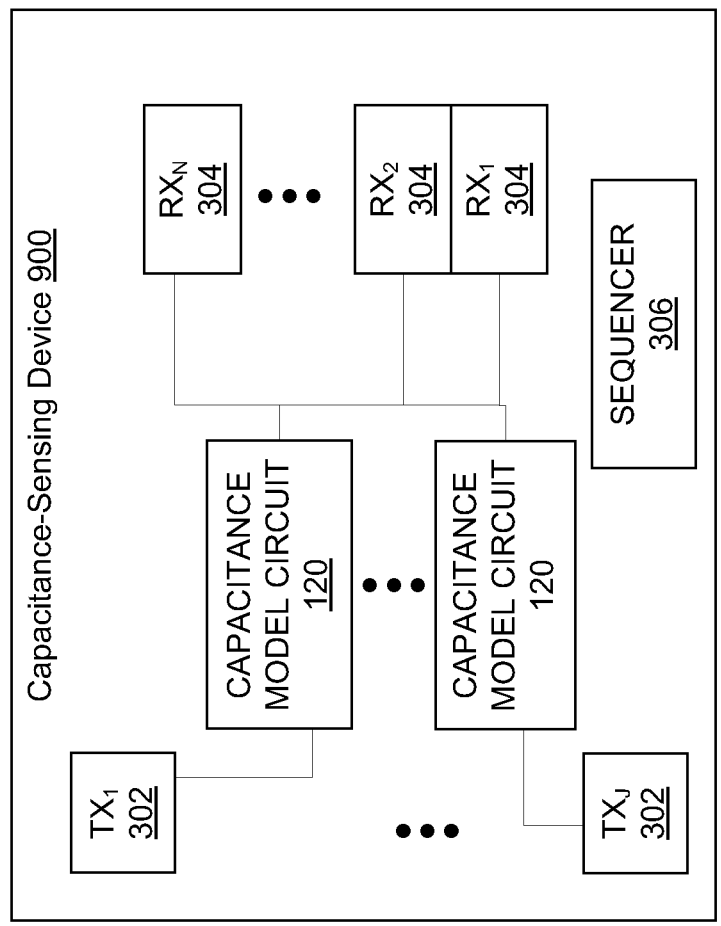
FIG. 9 is a circuit diagram illustrating one embodiment of a capacitance-sensing device including multiple capacitance model circuits.

FIG. 9 is a circuit diagram illustrating one embodiment of a capacitance-sensing device 900 including multiple capacitance model circuits 120. The capacitance-sensing device 900 is similar to the capacitance-sensing device 300 as noted by similar reference numbers. The capacitance-sensing device 900 includes two capacitance model circuits 120 and multiple TX channels 302. In one embodiment, each TX channel 302 is coupled to a transmitter. In another embodiment, the capacitance-sensing device 900 may include a single transmitter that outputs different TX signals to the two capacitance model circuits 120. Also, it should be noted that in other embodiments, the capacitance-sensing device 900 may include more than two capacitance model circuits 120. As above, the sequencer 306 is configured to connect and disconnect the TX channels 302 and the RX channels 304 to the capacitance model circuits 120. The sequencer 306 is also configured to control the timing of the TX signals on the TX channels 302 and the timing of the sensing by the RX channels 304. Like the capacitance-sensing device 300, no external components are needed to test the capacitance-sensing device 900. The test may be easily performed during production to exercise the full sense functionality of the integrated circuit.

The capacitance model circuits 120 allow on-chip testing, including BIST at production of the capacitance-sensing device 900 and useful for failure analysis (FA) of the capacitance-sensing device 900. As described above, the capacitance model circuits 120 include programmable capacitors and have the ability to model various types of capacitances, including, but not limited to, mutual capacitance, self capacitance, or any combination thereof. The capacitance model circuits 120 may provide tight matching between on-chip capacitors.

Using the embodiments described herein, full testing of the integrated circuit can be achieved without connecting to an external sense array, such as an external touch screen or a discrete array of capacitors. This can simplify the char bard for testing. The different sensing modes can be tested as described above. Using the capacitance model circuit, the channel linearity and matching characterization is possible. The embodiments can be used to ensure that all sensing channels are exposed to the same input conditions, thereby allowing isolation of the channel linearity from other non-linearity of other components within the system.

Figure 10:
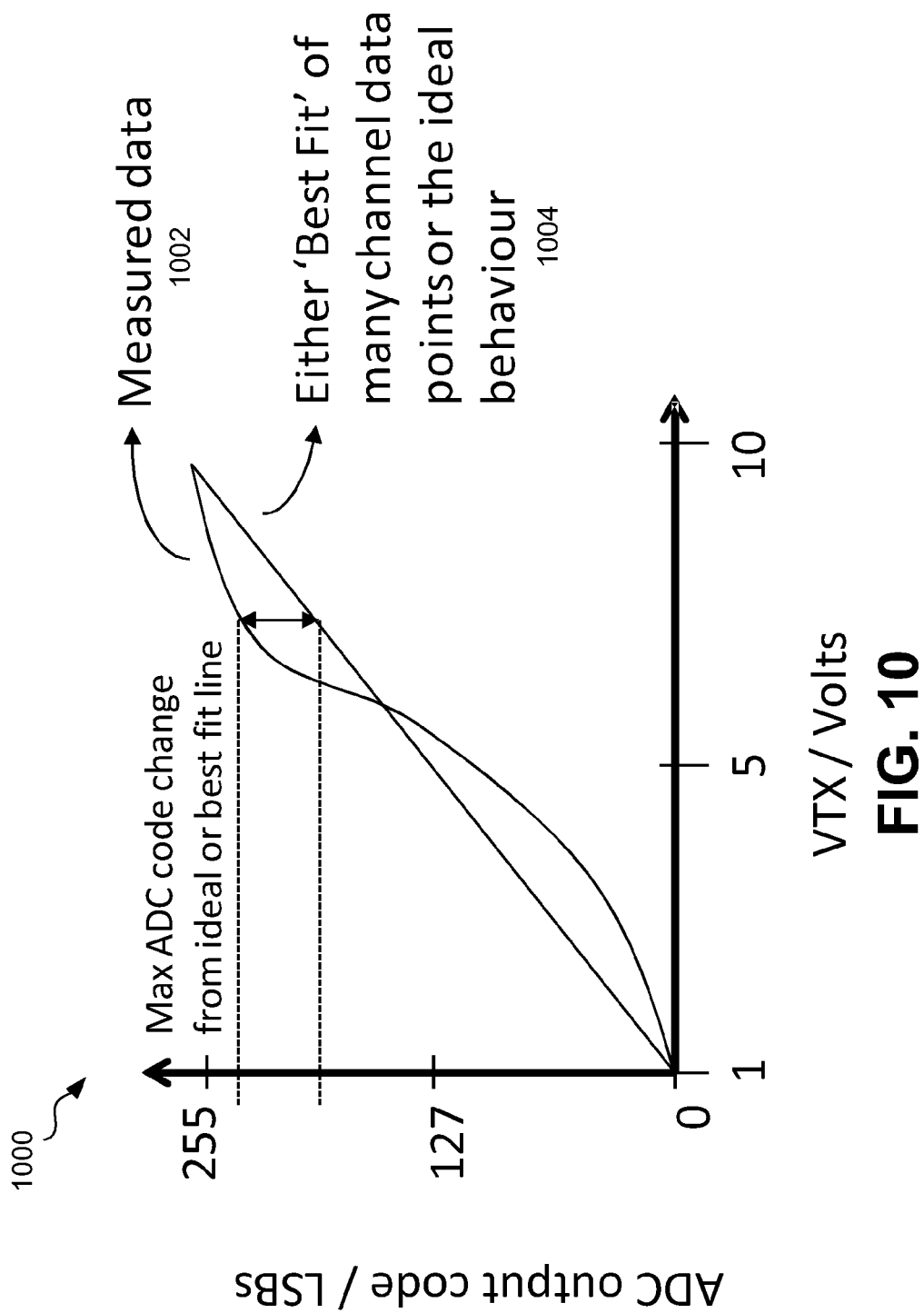
FIG. 10 is a graph plotting linearity and matching during characterization of the capacitance-sensing device according to one embodiment.

FIG. 10 is a graph 1000 plotting linearity and matching during characterization of a capacitance-sensing device according to one embodiment. The graph plots the least significant bits (LSBs) of an analog-to-digital converter (ADC) output code against a voltage of the TX signal (VTX). The measured data 1002 represents the ADC output code as the VTX is varied. The line 1004 represents an ideal line or a best fit line. The channel matching is the slope of the line 1004. Channel matching may be performed for mutual capacitance and self capacitance.

For mutual capacitance sensing mode 500, such as described above with respect to FIG. 5, the channel linearity and matching testing may be performed as follows: 1) Set up the model for mutual sensing (as described in FIG. 5; 2) Vary the TX voltage (VTX) and measure the ADC output code for each voltage; 3) Plot VTX vs ADC code change; 4) Look at the deviation from an ideal line or best fit line in percent change in ADC codes (this is the non-linearity). For example, a Max 5 codes change is (5/255)×100 for an 8 Bit ADC where 8 bits=$2^8$−1=255; and 5) Channel matching is the slope of the line compared to the ideal. In another embodiment, a binary or thermometer coded capacitive array may be used such that the capacitors generate a ramp signal, not the TX.

For self capacitance sensing mode 600, such as described above with respect to FIG. 6, the channel linearity and matching testing may be performed as follows: 1) Set up the model for self capacitance sensing (as described in FIG. 6); 2) Vary the RX voltage (VRX) and measure the ADC output code for each voltage; 3) Plot VRX vs ADC code change; 4) Look at the deviation from an ideal line or best fit line in percent change in ADC codes (this is the non-linearity). For example, a Max 5 codes change is (5/255)×100 for an 8 Bit ADC where 8 bits=$2^8$−1=255; and 5) Channel matching is the slope of the line compared to the ideal.

In other embodiments, the capacitance model circuit can be used to debug customer issues and perform failure analysis. The capacitance model circuit can be used with a particular channel to facilitate running the capacitance-sensing device and compare the results of one channel to another. In addition, it can be used to debug issues with the TX signal, shield drivers, or the like.

Figure 11:
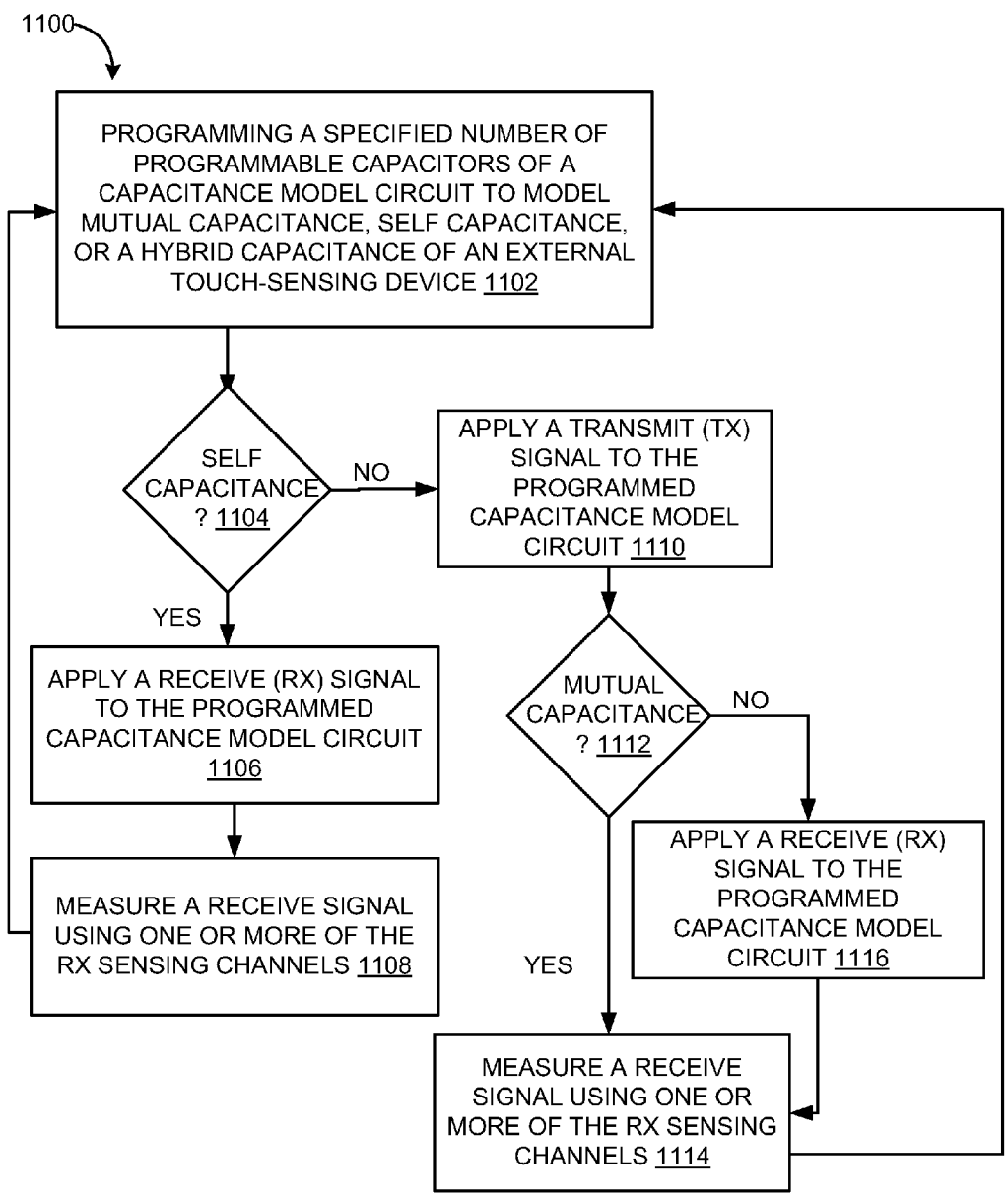
FIG. 11 is a flow diagram of a method of programming and testing a capacitance-sensing device using a capacitance model circuit according to an embodiment.

FIG. 11 is a flow diagram of a method 1100 of programming and testing a capacitance-sensing device using a capacitance model circuit according to an embodiment. The method 1100 may be performed by processing logic that may comprise hardware (circuitry, dedicated logic, etc.), software (such as is run on a general purpose computing system or a dedicated machine), firmware (embedded software), or any combination thereof. In one embodiment, the processing device 110 performs the method 1100. In another embodiment, the capacitance-sensing circuit 101 and the capacitance model circuit (120 or 820) performs the method 1100. Alternatively, other components of the electronic system 100 perform some or all of the operations of method 1100.

Referring to FIG. 11, the method 1100 begins with programming a specified number of programmable capacitors of a capacitance model circuit to model mutual capacitance, self capacitance, or a hybrid of an external sense array (block 1102). Next, the processing logic determines if the capacitance model circuit is programmed for self capacitance (block 1104). If self capacitance is being tested, the processing logic applies a receive (RX) signal to the programmed capacitance model circuit (block 1106), and measures this RX signal using one or more of the RX sensing channels (block 1108). The method 1100 may return to block 1102 to program the capacitance model circuit to have another capacitance or to switch to another RX channel as described herein. If at block 1104, self capacitance is not being tested, the processing logic applies a transmit (TX) signal to the programmed capacitance circuit model (block 1110). The processing logic determines if mutual capacitance is being tested (block 1112). If so, the processing logic measures a RX signal using one or more of the RX sensing channels (block 1114), and the method 110 may return to block 1102 to program the capacitance model circuit to have another capacitance or to switch to another RX channel as described herein. If mutual capacitance sensing is not being tested at block 1112, the processing logic applies a RX signal to the programmed capacitance model circuit (block 1116). The TX signal modulates in the same direction and magnitude as the RX signal. This may be for the hybrid sensing mode 700 described above with respect to FIG. 7.

In another embodiment of a method of programming and testing a capacitance-sensing device, the processing logic programs a capacitance model circuit disposed on a common carrier substrate of an integrated circuit. The integrated circuit includes a capacitance-sensing circuit having multiple sensing channels. The processing logic tests the capacitance-sensing circuit using the capacitance model circuit. In a further embodiment, the programming includes programming a specified number of programmable capacitors to model a mutual capacitance of an external sense array. The processing logic enables a first sensing channel of the multiple sensing channels, enables a transmit signal to be applied to the programmable capacitors, and measures a first mutual capacitance of the programming capacitors using the first sensing channel. The processing logic then enables a second sensing channel of the multiple channels and measures a second mutual capacitance of the programming capacitors using the second sensing channel.

In another embodiment, the programming includes programming a specified number of programmable capacitors to model a self capacitance of an external sense array. The processing logic enables a first sensing channel of the multiple sensing channels, applies a receive signal to the programmable capacitors, and measures a first self capacitance of the programming capacitors using the first sensing channel. The processing logic then enables a second self sensing channel of the multiple sensing channels, applies the receive signal to the programmable capacitors, and measures a second self capacitance of the programming capacitors using the second sensing channel.

In another embodiment, the programming includes programming a specified number of programmable capacitors to model a mutual capacitance and a self capacitance of an external sense array. The processing logic enables a first sensing channel, enables a transmit signal to be applied to the programmable capacitors at a first instance, applies a receive signal to the programmable capacitors, and measures a first capacitance of the programming capacitors using the first sensing channel. The processing logic then enables a second self sensing channel, enabling the transmit signal to be applied to the programmable capacitors at a second instance, applies the receive signal to the programmable capacitors, and measures a second capacitance of the programming capacitors using the second sensing channel.

In other embodiments, instead of switching sensing channels, the processing logic can program different mutual capacitances, different self capacitances, or hybrid capacitance of the programmable capacitors.

In some embodiments, the integrated capacitance model circuit can be implemented in the architecture of a capacitive touch screen controller. In one embodiment, the capacitive touch screen controller is the TrueTouch® capacitive touch-screen controllers, such as the TMA4xx (Gen4) family of TrueTouch® Multi-Touch All-Points touchscreen controllers, developed by Cypress Semiconductor Corporation of San Jose, Calif. The TrueTouch® capacitive touchscreen controllers sensing technology to resolve touch locations of multiple fingers and a stylus on the touchscreens up to 5 inches, supports leading operating systems, and is optimized for low-power multi-touch gesture and all-point touchscreen functionality. Alternatively, the features of the integrated capacitance model circuit may be implanted in other touchscreen controllers, other touch controllers of touch-sensing devices, or other processing devices as described herein.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. An integrated circuit comprising:
   a capacitance-sensing device disposed on an common carrier substrate of the integrated circuit; and
   a capacitance model circuit disposed on the common carrier substrate, wherein the capacitance model circuit is configured to model a capacitance of an external sense array, and wherein the capacitance model circuit is programmable, wherein the capacitance model circuit comprises:
      an input comprising a switch coupled to receive a transmit (TX) signal;
      an output comprising a plurality of switches coupled to output a receive (RX) signal; and a plurality of programmable capacitors coupled to at least one of the input or output, wherein the plurality of programmable capacitors comprises:
  a first set of one or more capacitors coupled between the input and output;
  a first set of one or more switches, each coupled to one of the first set of capacitors to turn on and off the corresponding capacitor;
  a second set of one or more capacitors coupled between a ground potential and the output; and
  a second set of one or more switches, each coupled to one of the second set of capacitors to turn on and off the corresponding capacitor.

2. The integrated circuit of claim 1, wherein the capacitance model circuit is configured to model an intersection of electrodes of the external sense array.

3. The integrated circuit of claim 1, wherein the capacitance model circuit comprises at least one of programmable mutual capacitance and programmable self capacitance.

4. The integrated circuit of claim 1, wherein the capacitance-sensing device comprises:
  a transmitter;
  a plurality of receive channels of a capacitance-sensing circuit; and
  a sequencer coupled to the capacitance model circuit, wherein the sequencer is configured to couple the transmitter to an input of the capacitance model circuit and to couple an output of the capacitance model circuit to one or more of the plurality of receive channels.

5. The integrated circuit of claim 1, wherein the first set of one or more capacitors are coupled in parallel to one another, and wherein the second set of one or more capacitors are coupled in parallel to one another.

6. The integrated circuit of claim 1, wherein the first set of one or more capacitors are configured to model a mutual capacitance of the external sense array.

7. The integrated circuit of claim 1, wherein the second set of one or more capacitors are configured to model a self capacitance of the external sense array.

8. The integrated circuit of claim 1, wherein the capacitance model circuit is configured to model both a mutual capacitance and a self capacitance of the external sense array.

9. The integrated circuit of claim 1, wherein the external sense array is a touchscreen.

10. The integrated circuit of claim 1, wherein the capacitance model circuit comprises a plurality of programmable capacitors.

11. The integrated circuit of claim 10, wherein the plurality of programmable capacitors are at least one of vertical parallel plate (VPP) capacitors, metal oxide semiconductor (MOS) capacitors, or metal-insulator-metal (MIM) capacitors.

12. An integrated circuit comprising:
  a capacitance-sensing circuit comprising a plurality of sensing channels; and
  a capacitance model circuit comprising a plurality of programmable capacitors, wherein the capacitance model circuit is configured to model a capacitance of an external sense array to test the plurality of sensing channels of the capacitance-sensing circuit, wherein the capacitance-sensing circuit comprises:
    a transmitter; and
    a sequencer coupled to the capacitance model circuit, wherein the sequencer is configured to couple the transmitter to an input of the capacitance model circuit and to couple an output of the capacitance model circuit to one or more of the plurality of sensing channels.

13. The integrated circuit of claim 12, wherein the capacitance model circuit is configured to model at least one of a mutual capacitance, a self capacitance, or a combination of both.

* * * * *